(12) United States Patent
Bai

(10) Patent No.: US 10,788,860 B2
(45) Date of Patent: Sep. 29, 2020

(54) DISPLAY SCREEN COMPONENT AND FOLDABLE DEVICE HAVING SAME

(71) Applicant: GUANGDONG OPPO MOBILE TELECOMMUNICATIONS CORP., LTD., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/384,858

(22) Filed: Apr. 15, 2019

(65) Prior Publication Data

US 2019/0361502 A1 Nov. 28, 2019

(30) Foreign Application Priority Data

May 25, 2018 (CN) .......................... 2018 1 0515630
May 25, 2018 (CN) ..................... 2018 2 0806561 U

(51) Int. Cl.
*G06F 1/16* (2006.01)
*H04M 1/02* (2006.01)

(52) U.S. Cl.
CPC .......... *G06F 1/1641* (2013.01); *G06F 1/1616* (2013.01); *G06F 1/1652* (2013.01);
(Continued)

(58) Field of Classification Search
CPC .... G06F 1/1641; G06F 1/1652; G06F 1/1677; G06F 1/1686; H04M 1/0241; H04M 1/0243; H04M 1/0264
See application file for complete search history.

(56) References Cited

U.S. PATENT DOCUMENTS 6,922,212 B2 * 7/2005 Nakakubo ............ H04N 5/2251
348/373
7,565,183 B2 * 7/2009 Vance .................. H04M 1/0208
348/373
(Continued)

FOREIGN PATENT DOCUMENTS

CN 105988519 10/2016
CN 106774671 5/2017
(Continued)

OTHER PUBLICATIONS

EPO, Office Action for EP Application No. 19176163.4, dated Aug. 6, 2019.

(Continued)

*Primary Examiner* — Adrian S Wilson
(74) *Attorney, Agent, or Firm* — Hodgson Russ LLP

(57) ABSTRACT

A display screen component and a foldable device having same are provided. The display screen component includes a display screen including a first display portion having a rear wall and a second display portion, the first display portion being connected with the second display portion and configured to be foldable with respect to the second display portion; and a camera coupled to the rear wall. The camera is configured to be moved as the first display portion is folded and unfolded with respect to the second display portion, so as to capture images of different regions when the first display portion is folded or unfolded with respect to the second display portion.

16 Claims, 6 Drawing Sheets

(52) U.S. Cl.
CPC .......... *G06F 1/1677* (2013.01); *G06F 1/1686* (2013.01); *H04M 1/0243* (2013.01); *H04M 1/0264* (2013.01)

(56) References Cited

U.S. PATENT DOCUMENTS

| | | | | |
|---|---|---|---|---|
| 7,768,778 B2* | 8/2010 | Huang | ................. | G06F 1/1632 340/5.1 |
| 8,265,705 B2* | 9/2012 | Lee | ................. | G06F 1/1616 455/566 |
| 9,967,376 B2* | 5/2018 | Zhang | ................. | H04M 1/026 |
| 2008/0068292 A1* | 3/2008 | Yuan | ................. | G06F 3/1438 345/2.1 |
| 2016/0026219 A1* | 1/2016 | Kim | ................. | H04M 1/0245 345/173 |
| 2016/0241686 A1* | 8/2016 | Zhang | ................. | H04M 1/026 |
| 2018/0375975 A1* | 12/2018 | Kikuchi | ................. | H04M 1/0268 |
| 2019/0364185 A1* | 11/2019 | Bai | ................. | H04M 1/0225 |

FOREIGN PATENT DOCUMENTS

| | | |
|---|---|---|
| CN | 107180597 | 9/2017 |
| CN | 107508934 | 12/2017 |
| CN | 107623793 | 1/2018 |
| CN | 107635036 | 1/2018 |
| CN | 107765775 | 3/2018 |
| CN | 107770440 | 3/2018 |
| CN | 108449461 | 8/2018 |
| CN | 208386624 | 1/2019 |
| EP | 2981050 | 2/2016 |
| WO | 2014148698 | 9/2014 |

OTHER PUBLICATIONS

SIPO, First Office Action for CN Application No. 201810515630.0, dated Sep. 4, 2019.
WIPO, English translation of the ISR and WO for PCT/CN2019/087362, dated Jul. 26, 2019.
SIPO, Third Office Action for CN Application No. 201810515630.0, dated May 19, 2020.

* cited by examiner

DISPLAY SCREEN COMPONENT AND FOLDABLE DEVICE HAVING SAME

CROSS REFERENCE TO RELATED APPLICATION

The present application claims priority to Chinese Applications No. 201820806561.4 and 201810515630.0, filed on May 25, 2018. The entire disclosures of the aforementioned patent applications are incorporated herein by reference.

FIELD

The present disclosure relates to a field of communication equipment, and more particularly, to a display screen component and a foldable device having same.

BACKGROUND

The screen-to-body ratio (a ratio of an area of a display screen to an area of a front panel of an electronic device) of the electronic devices has always been focus of attention of users. In the related art, a full-screen electronic device (like a mobile phone) has a screen-to-body ratio of 80% or more, but since a front camera of the electronic device needs to occupy a part of the space of the front panel, the electronic device can never achieve the screen-to-body ratio of 100%, which seriously hinders the development of the full screen of the electronic device.

SUMMARY

Embodiments of a first aspect of the present disclosure provide a display screen component for a foldable device. The display screen component includes: a display screen including a first display portion having a rear wall and a second display portion, the first display portion being connected with the second display portion, and configured to be foldable with respect to the second display portion; and a camera coupled to the rear wall. The camera is configured to be moved as the first display portion is folded and unfolded with respect to the second display portion, so as to capture images of different regions when the first display portion is folded or unfolded with respect to the second display portion.

Embodiments of a second aspect of the present disclosure provide a foldable device. The foldable device includes a housing and a display screen component received in the housing. The display screen component includes: a display screen including a first display portion having a rear wall and a second display portion, the first display portion being connected with the second display portion, and configured to foldable with respect to the second display portion; and a camera disposed to the rear wall and configured to capture an image through the housing. The camera is configured to be moved as the first display portion is folded or unfolded with respect to the second display portion, so as to capture images of different regions when the first display portion is folded or unfolded with respect to the second display portion.

Embodiments of a third aspect of the present disclosure provide another foldable device. The foldable device includes: a housing including a rear panel, and a frame connected to a front side of the rear panel and surrounding the rear panel; a display screen received in the housing and having a side peripheral wall fitted with the frame, the display screen including a first display portion and a second display portion connected to each other, the first display portion being configured to be folded or unfolded with respect to the second display portion; and a camera disposed to the first display portion and located between the display screen and the rear panel, the camera being configured to be moved along with the first display portion and further to capture an image through the rear panel.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings.

DETAILED DESCRIPTION

Figure 1:
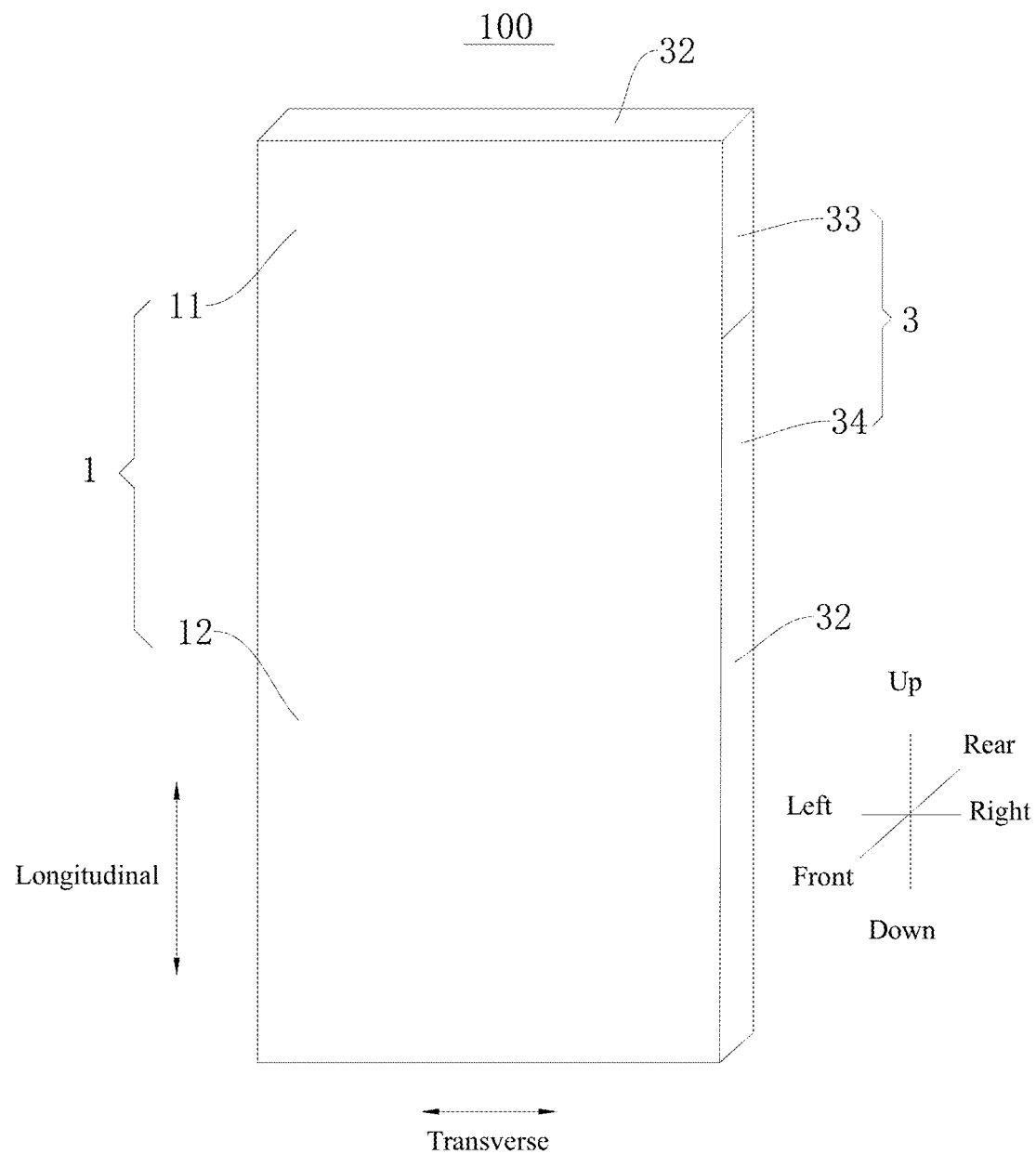
FIG. 1 illustrates a schematic view of a foldable device in an unfolded state according to an embodiment of the present disclosure.

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

In the specification, it is to be understood that terms such as "longitudinal," "transverse," "length," "width," "thickness," "upper," "lower," "front," "rear," "left," "right," "vertical," "horizontal," "top," "bottom," "inner," and "outer" should be construed to refer to the orientation as then described or as shown in the drawings under discussion. These relative terms are for convenience of description and do not require that the present disclosure have a particular orientation or be constructed and operated in a particular orientation. Thus, these relative terms shall not be constructed to limit the present disclosure. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means two or more than two, unless specified otherwise.

In the present disclosure, it should be noted that, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Embodiments of the present disclosure provide a display screen component for a foldable device. The display screen component includes: a display screen including a first display portion having a rear wall and a second display portion, the first display portion being connected with the second display portion, and configured to be foldable with respect to the second display portion; and a camera coupled to the rear wall. The camera is configured to be moved as the first display portion is folded and unfolded with respect to the second display portion, so as to capture images of different regions when the first display portion is folded or unfolded with respect to the second display portion.

Embodiments of the present disclosure provide a foldable device. The foldable device includes a housing and a display screen component received in the housing. The display screen component includes: a display screen including a first display portion having a rear wall and a second display portion, the first display portion being connected with the second display portion, and configured to foldable with respect to the second display portion; and a camera disposed to the rear wall and configured to capture an image through the housing. The camera is configured to be moved as the first display portion is folded or unfolded with respect to the second display portion, so as to capture images of different regions when the first display portion is folded or unfolded with respect to the second display portion.

Embodiments of the present disclosure provide another foldable device. The foldable device includes: a housing including a rear panel, and a frame connected to a front side of the rear panel and surrounding the rear panel; a display screen received in the housing and having a side peripheral wall fitted with the frame, the display screen including a first display portion and a second display portion connected to each other, the first display portion being configured to be folded or unfolded with respect to the second display portion; and a camera disposed to the first display portion and located between the display screen and the rear panel, the camera being configured to be moved along with the first display portion and further to capture an image through the rear panel.

A foldable device 100 according to embodiments of the present disclosure will be described with reference to FIGS. 1-5.

As illustrated in FIGS. 1-5, the foldable device 100 according to embodiments of the present disclosure includes a display screen component, and the display screen component includes a display screen 1 and a camera 2.

The display screen 1 includes a first display portion 11 and a second display portion 12, which are configured to provide a user with display information. The first display portion 11 is connected with the second display portion 12. It should be noted that the first display portion 11 and the second display portion 12 may be directly connected, and for example, may be integrally formed, such that the first display portion 11 and the second display portion 12 are seamlessly connected. Certainly, the first display portion 11 and the second display portion 12 may also be connected by means of an intermediate piece, that is, the first display portion 11 and the second display portion 12 are indirectly connected via the intermediate piece, such that an isolation region exists between the first display portion 11 and the second display portion 12.

Figure 2:
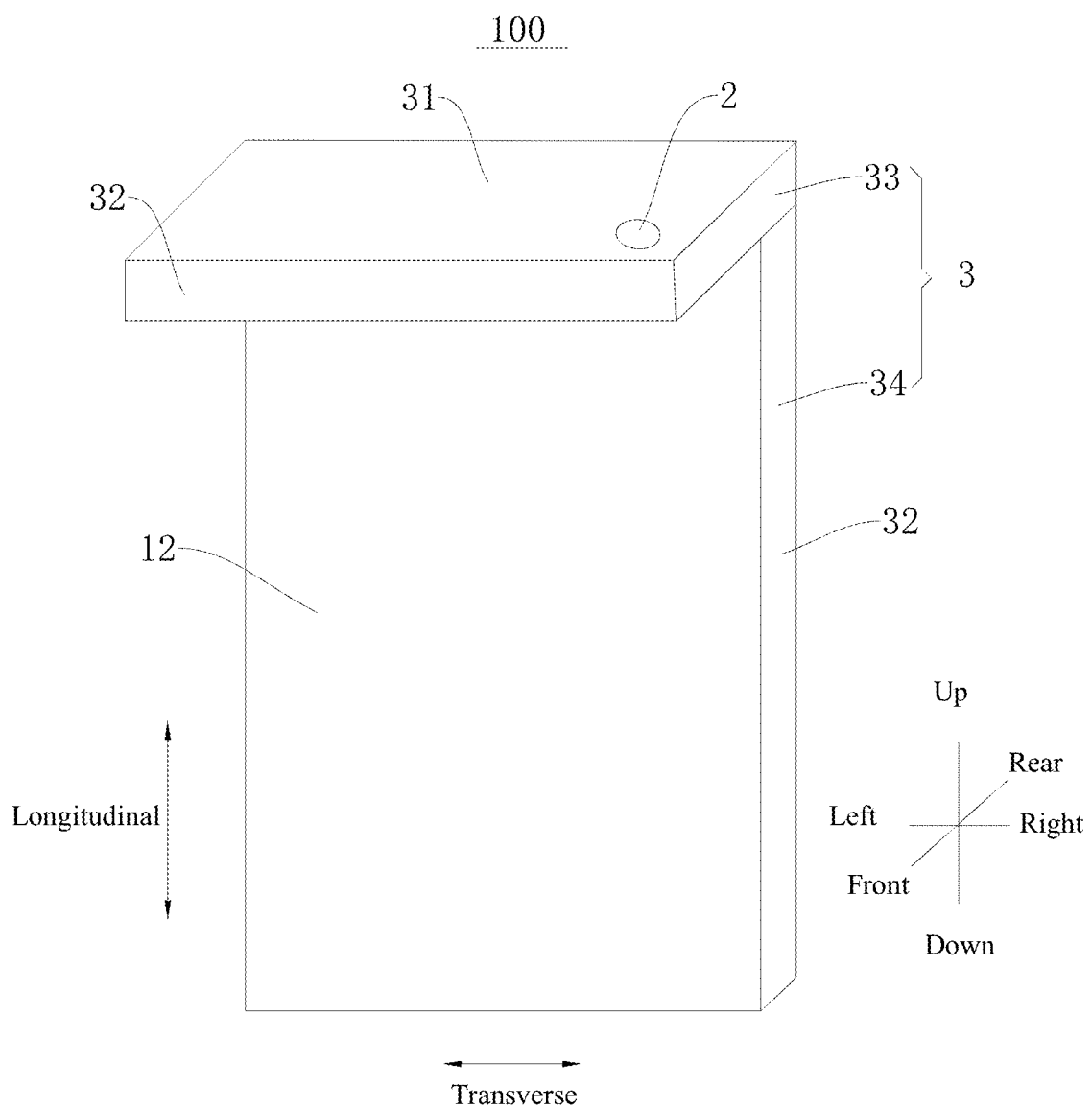
FIG. 2 illustrates a schematic view of a foldable device in a first folded state according to an embodiment of the present disclosure.
Figure 3:
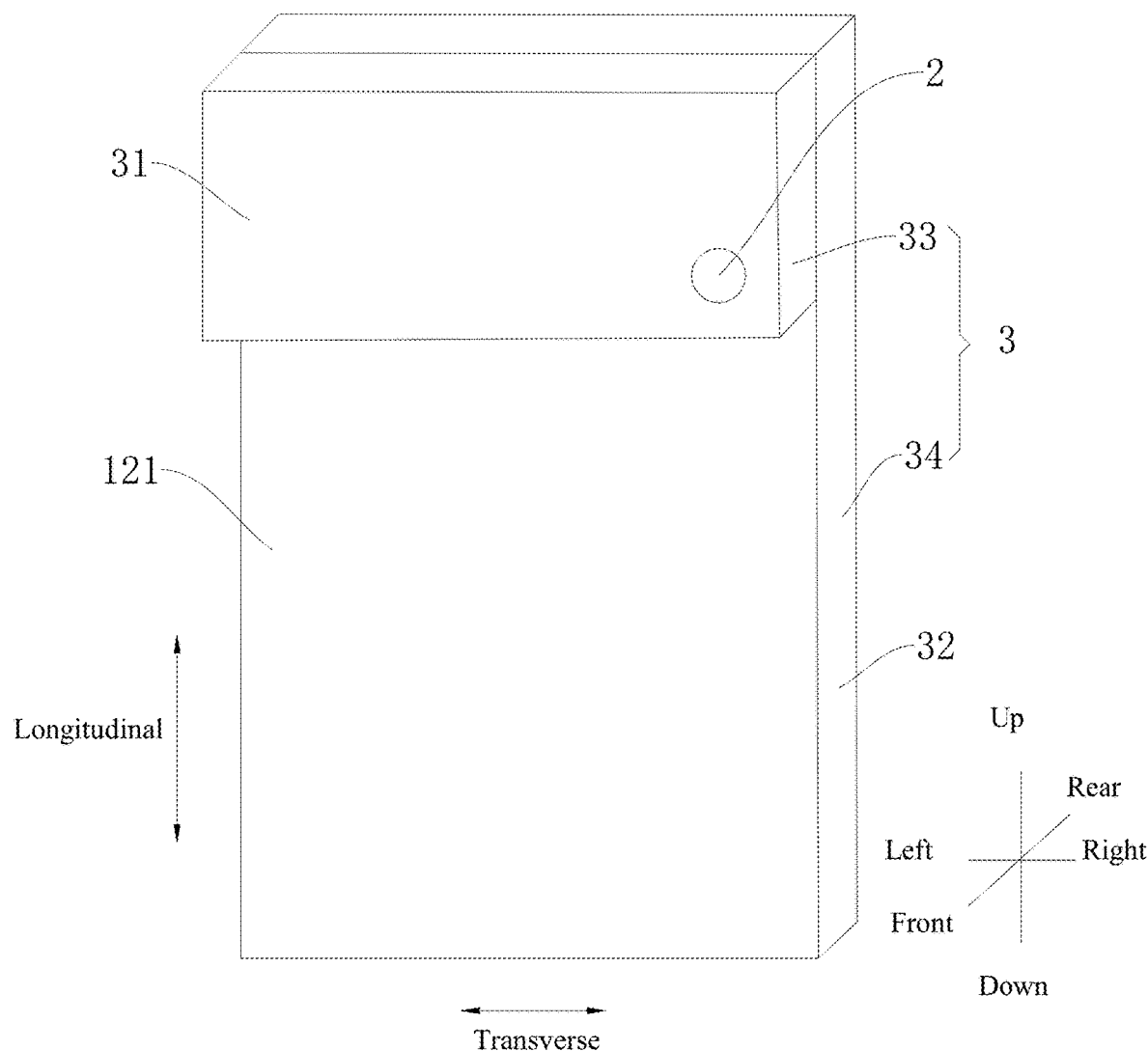
FIG. 3 illustrates a schematic view of a foldable device in a second folded state according to an embodiment of the present disclosure.
Figure 6:
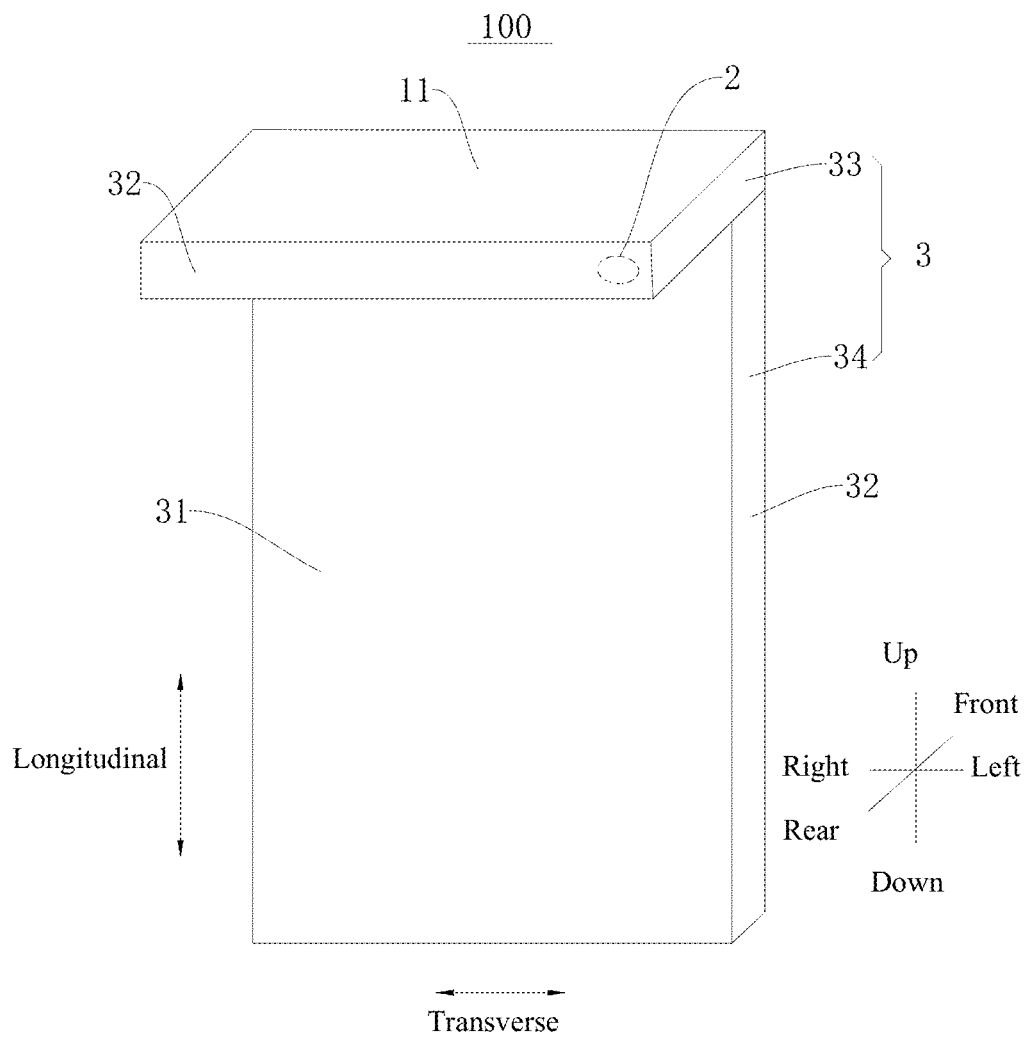
FIG. 6 illustrates a schematic view of a foldable device in a third folded state according to an embodiment of the present disclosure.

The first display portion 11 is configured to be folded and unfolded with respect to the second display portion 12, that is, the first display portion 11 can be folded with respect to the second display portion 12, and the first display portion 11 can also be unfolded with respect to the second display portion 12. For example, as illustrated in FIGS. 1-3, the display screen 1 illustrated in FIG. 1 is in an unfolded state where the first display portion 11 is unfolded with respect to the second display portion 12, such that the first display portion 11 and the second display portion 12 are in the same plane and define an angle of 180 degrees therebetween in this case. When the first display portion 11 is rotated forwards or backwards from the unfolded state illustrated in FIG. 1, the first display portion 11 is folded with respect to the second display portion 12, in which an angle of rotation of the first display portion 11 with respect to the second display portion 12 can be freely selected as needed. For example, the first display portion 11 can be rotated forwards by 45° or 90° (for example as illustrated in FIG. 2) or 180° (for example as illustrated in FIG. 3), and can be rotated backwards by 45°, 90° (for example as illustrated in FIG. 6) or 180°.

It should be noted that each of the first display portion 11 and the second display portion 12 includes a plurality of pixel units, and each pixel unit includes three sub-pixels R, G, and B. Each sub-pixel can be independently controlled to be lit or extinguished, and sub-pixels of three colors (red, green and blue) can be combined into various colors and patterns. Thus, the first display portion 11 and the second display portion 12 can exhibit various interfaces to provide the user with the display information. The display screen 1 may have various display modes, such as a full-screen display mode (i.e., the first display portion 11 and the second display portion 12 collectively provide the display information to the user), a first-display-portion display mode (i.e., only the first display portion 11 provides the display information to the user), and a second-display-portion display mode (i.e., only the second display portion 12 provides the display information to the user). The display mode of the display screen 1 can be switched correspondingly according to a folding angle and a folding direction of the first display portion 11 with respect to the second display portion 12. For instance, the foldable device 100 may further include a detecting device and a switching device. The detecting device is configured to detect the folding angle and the folding direction of the first display portion 11, and is coupled with the switching device. The switching device is configured to switch the display mode of the display screen 1 according to the folding angle detected by the detecting device.

The camera 2 is disposed to a rear wall of the first display portion 11 and configured to capture an image in an outer normal direction of the rear wall of the first display portion 11. The camera 2 is moved as the first display portion 11 is folded and unfolded with respect to the second display portion 12, so as to capture images of different regions when the first display portion 11 is folded or unfolded with respect to the second display portion 12. Specifically, when the first display portion 11 is folded with respect to the second display portion 12, the position of the rear wall of the first display portion 11 will change, and thus the outer normal direction of the rear wall of the first display portion 11 will change as well. Therefore, the angle or the region of the image acquisition of the camera 2 will change accordingly.

For example, when the display screen 1 is in the unfolded state, as illustrated in FIG. 1, the rear wall of the first display portion 11 faces rearwards, and the outer normal direction of the rear wall of the first display portion 11 horizontally extends rearwards, such that the camera 2 can capture an image at a rear side of the foldable device 100, that is, the camera 2 may serve as a rear camera 2 in this case. When the first display portion 11 is rotated forwards by 90° with respect to the second display portion 12 from the unfolded state, as illustrated in FIG. 2, the rear wall of the first display portion 11 faces upwards, and the outer normal direction of the rear wall of the first display portion 11 vertically extends upwards, such that the camera 2 can capture an image above the foldable device 100 in this case. When the first display portion 11 is rotated forwards by 180° with respect to the second display portion 12 from the unfolded state, as illustrated in FIG. 3, the rear wall of the first display portion 11 faces forwards, and the outer normal direction of the rear wall of the first display portion 11 horizontally extends forwards, such that the camera 2 can capture an image in front of the foldable device 100, that is, the camera 2 may serve as a front camera 2.

It could be understood that the camera 2 of the above foldable device 100 can not only capture images at the rear side, the upper side and the front side of the foldable device 100, but also capture images from other angles by controlling the folding angle and the folding direction of the first display portion 11. For example, when the first display portion 11 is rotated forwards by 45° with respect to the second display portion 12 from the unfolded state, the camera 2 can capture an image of a region located obliquely above the rear side of the foldable device 100. When the first display portion 11 is rotated backwards by 90° with respect to the second display portion 12 from the unfolded state, the camera 2 can capture an image of a region located below the foldable device 100.

It should be noted that the terms such as "front", "rear", "below" and "above" used in the present disclosure shall be understood in a following manner: in the unfolded state that the first display portion 11 is unfolded with respect to the second display portion 12, when the user faces the display screen 1 to obtain the display information provided on the display screen 1, a side of the display screen 1 facing the user is defined as "front", a side of the display screen 1 facing away from the user is "rear", a direction of gravity of the display screen 1 is "below", and a direction opposite to the direction of gravity is "above".

In the foldable device 100 according to embodiments of the present disclosure, since the camera 2 is disposed to the rear wall of the first display portion 11 and can capture images in the outer normal direction of the rear wall of the first display portion 11, the camera 2 can capture images of different regions by folding and unfolding the first display portion 11, thereby satisfying a requirement of different photographing angles. The camera 2 does not need to capture images through a plane where the display screen 1 is located, thereby eliminating the need to reserve space for image acquisition in the plane where the display screen 1 is located. For example, it is not necessary to provide a through hole or a transparent region in the plane where the display screen 1 is located, thereby improving a screen-to-body ratio and achieving a full-screen effect.

In an embodiment of the present disclosure, the first display portion 11 can be folded forwards with respect to the second display portion 12. That is, the display screen 1 can be folded inwards. In such a case, by folding the first display portion 11 forwards, the camera 2 may serve as the front camera 2, so as to avoid reserving the space for the image acquisition in the plane where the display screen 1 is located, thereby improving the screen-to-ratio of the foldable device 100 and achieving the full-screen effect.

In an embodiment of the present disclosure, the first display portion 11 can be folded backwards with respect to the second display portion 12. That is, the display screen 1 can be folded outwards. In such a case, by folding the first display portion 11 backwards, the camera 2 can capture images in various orientations. For example, as illustrated in FIG. 6, when the first display portion 11 is rotated backwards by 90° with respect to the second display portion 12, the camera 2 can capture an image of a region located below the foldable device 100.

In an embodiment of the present disclosure, as illustrated in FIGS. 1-3, the area of the first display portion 11 is smaller than the area of the second display portion 12. When the first display portion 11 is folded with respect to the second display portion 12, a part of the second display portion 12 that does not overlap the first display portion 11 in a front and rear direction (i.e. a direction perpendicular to the first display portion) forms an exposed portion 121. Further, when the first display portion 11 is folded with respect to the second display portion 12, the image information acquired by the camera 2 is displayed on the exposed portion 121 and the user can operate on the exposed portion 121. That is, the foldable device 100 further has an exposed-portion display mode, i.e., the exposed portion 121 displays the image captured by the camera 2 when the first display portion 11 is folded, thereby facilitating the photographing by the user.

In an embodiment of the present disclosure, as illustrated in FIGS. 1-3, a folding line of the first display portion 11 being folded with respect to the second display portion 12 extends in a transverse direction, thereby facilitating folding and unfolding of the first display portion 11.

Further, as illustrated in FIGS. 1-3, the first display portion 11 and the second display portion 12 have the same width in the transverse direction, but the first display portion 11 has a length smaller than a length of the second display portion 12 in a longitudinal direction.

In some embodiments of the present disclosure, a ratio of the length of the first display portion 11 in the longitudinal direction to the length of the second display portion 12 in the longitudinal direction ranges from $1/10$ to $1/2$. That is, the ratio of the length of the first display portion 11 in the longitudinal direction to the length of the second display portion 12 in the longitudinal direction is at least 1/10 and at most 1/2, thus facilitating an increase of the area of the exposed portion 121, and improving a visual effect for the user.

In some embodiments of the present disclosure, the ratio of the length of the first display portion 11 in the longitudinal direction to the length of the second display portion 12 in the longitudinal direction ranges from 1/10 to 1/4. That is, the ratio of the length of the first display portion 11 in the longitudinal direction to the length of the second display portion 12 in the longitudinal direction is at least 1/10 and at most 1/4. For example, the ratio of the length of the first display portion 11 in the longitudinal direction to the length of the second display portion 12 in the longitudinal direction may be 1/10, 1/9, 1/8, 1/7, 1/6, 1/4 or the like, so as to further increase the area of the exposed portion 121, thereby further improving the visual effect for the user.

In some embodiments of the present disclosure, as illustrated in FIG. 1, when the first display portion 11 is unfolded with respect to the second display portion 12, the first display portion 11 is located above the second display portion 12, thereby facilitating adjustment of the photographing angle of the camera 2 with respect to the user, so as to enhance a photographing effect of the camera 2.

In some embodiments of the present disclosure, when the first display portion 11 is unfolded with respect to the second display portion 12, the first display portion 11 may be located below the camera 2, thereby diversifying the structure of the foldable device 100.

In an embodiment of the present disclosure, the folding line of the first display portion 11 being folded with respect to the second display portion 12 extends along the longitudinal direction, such that the first display portion 11 can be folded and unfolded conveniently.

Further, the first display portion 11 and the second display portion 12 have the same length in the longitudinal direction, but the first display portion 11 has a width smaller than a width of the second display portion 12 in the transverse direction.

In some embodiments of the present disclosure, a ratio of the width of the first display portion 11 in the transverse direction to the width of the second display portion 12 in the transverse direction ranges from 1/5 to 1/2. That is, the ratio of the width of the first display portion 11 in the transverse direction to the width of the second display portion 12 in the transverse direction is at least 1/5 and at most 1/2, which facilitates an increase of the area of the exposed portion 121 and hence enhances the visual effect for the user.

In some embodiments of the present disclosure, the ratio of the width of the first display portion 11 in the transverse direction to the width of the second display portion 12 in the transverse direction ranges from 1/5 to 1/3. That is, the ratio of the width of the first display portion 11 in the transverse direction to the width of the second display portion 12 in the transverse direction is at least 1/5 and at most 1/3. For example, the ratio of the width of the first display portion 11 in the transverse direction to the width of the second display portion 12 in the transverse direction may be 1/5, 1/4, 1/3 or the like, so as to further increase the area of the exposed portion 121, thereby further improving the visual effect for the user.

In some embodiments of the present disclosure, when the first display portion 11 is unfolded with respect to the second display portion 12, the first display portion 11 is located at a left side of the second display portion 12, which facilitates the adjustment of the photographing angle of the camera 2 with respect to the user, thereby improving the photographing effect of the camera 2.

In some embodiments of the present disclosure, when the first display portion 11 is unfolded with respect to the second display portion 12, the first display portion 11 is located at a right side of the second display portion 12, thereby diversifying the structure of the foldable device 100.

In an embodiment of the present disclosure, the display screen 1 is configured as a flexible display screen 1, so as to prevent the first display portion 11 from being torn and damaged when being folded with respect to the second display portion 12.

In some embodiments of the present disclosure, the display screen 1 is an organic light-emitting diode (OLED) screen with great flexibility and good durability, and the OLED screen is a self-luminous screen and does not require a backlight, thereby omitting a backlight panel, reducing the thickness of the display screen 1, and facilitating miniaturization and lightweight development of the foldable device 100. Certainly, the present disclosure is not limited thereto, and the display screen 1 may also be a Mini LED screen or a Micro LED screen.

In an embodiment of the present disclosure, as illustrated in FIGS. 1-5, the foldable device 100 may further include a housing 3. The housing 3 includes a rear panel 31, and a frame 32 connected to a front side of the rear panel 31 and surrounding the rear panel 31. A side peripheral wall of the display screen 1 is fitted with the frame 32, such that the display screen 1 is assembled in the housing 3. The camera 2 is located between the display screen 1 and the rear panel 31, and can capture images through the rear panel 31. For example, the rear panel 31 may be provided with a through hole in a region of the rear panel 31 opposite to the camera 2, or the rear panel 31 may be provided with a transparent region in the region of the rear panel 31 opposite to the camera 2, such that the camera 2 can capture images through the through hole or the transparent region of the rear panel 31.

It could be understood that when the first display portion 11 is folded and unfolded with respect to the second display portion 12, a part of the housing 3 corresponding to the first display portion 11 will also be folded and unfolded with respect to another part of the housing 3 corresponding to the second display portion 12. Thus, as the camera 2 is moved along with the folding and unfolding of the first display portion 11, the region of the rear panel 31 of the housing 3 opposite to the camera 2 is moved synchronously with the camera 2, so as to guarantee the image acquisition of the camera 2 at different angles.

The camera 2 captures images through the rear panel 31 of the housing 3, so as to avoid providing any through hole or transparent region in the front panel of the foldable device 100, thereby increasing the screen-to-body ratio of the foldable device 100 and achieving the full-screen effect.

In an embodiment of the present disclosure, as illustrated in FIGS. 1-3, the housing 3 includes a first housing portion 33 and a second housing portion 34 rotatably connected to each other, the first display portion 11 is assembled in the first housing portion 33, and the second display portion 12 is assembled in the second housing portion 34. The camera 2 is provided in the first housing portion 33 and may capture images through a rear wall of the first housing portion 33. The folding line of the first display portion 11 being folded with respect to the second display portion 12 is parallel with a rotation axis of the first housing portion 33 rotated with respect to the second housing portion 34. When the first display portion 11 is folded with respect to the second display portion 12, the first housing portion 33 is rotated with respect to the second housing portion 34. Since the housing 3 includes the first housing portion 33 and the second housing portion 34 rotatably connected to each other, the first display portion 11 can be folded with respect to the second display portion 12 conveniently.

In an embodiment of the present disclosure, the housing 3 is a flexible member, such that the first display portion 11 can be folded and unfolded with respect to the second display portion 12 conveniently, and the housing 3 has a simple structure and is convenient to produce and manufacture. In some embodiments of the present disclosure, the housing 3 is a rubber member or a silicone member, that is, the housing 3 is made of a rubber material or a silicone material, which is quite flexible and low in cost.

In an embodiment of the present disclosure, the rear panel 31 of the housing 3 is provided with a rear display screen at a rear side of the rear panel 31, and the rear display screen has a rear display portion. When the first display portion 11 is in the folded state, the rear display portion faces forwards to provide the user with the display information, and the user can operate on the rear display portion, which makes it convenient for the user to photograph.

In some embodiments of the present disclosure, when the second display portion 12 has the above exposed portion 121, the rear display portion together with the exposed portion 121 can present the image captured by the camera 2, which can increase the area of the display region when the foldable device 100 is in a front photographing mode, thereby upgrading the visual effect.

In an embodiment of the present disclosure, a damping rubber strip is arranged between the display screen 1 and an inner side wall of the housing 3. By providing the damping rubber strip, collision between the display screen 1 and the housing 3 can be reduced when the foldable device 100 drops, so as to provide a damping function and realize protection of the display screen 1, thereby improving an anti-drop protection effect of the foldable device 100. In addition, the damping rubber strip can enhance a sealing effect between the display screen 1 and the housing 3, thus providing waterproof and rustproof functions.

In an embodiment of the present disclosure, the foldable device 100 is an electronic device. It should be noted that "the electronic device" in the present disclosure includes but is not limited to devices for receiving/transmitting a communication signal via a wired line connection (for example, via Public Switched Telephone Network (PSTN), Digital Subscriber Line (DSL), a digital cable, direct cable connection, and/or another data connection/network) and/or via a wireless interface (for example, cellular networks, wireless local area networks (WLANs), digital television networks (such as DVB-H networks), satellite networks, AM-FM broadcast transmitters, and/or another communication electronic device). Communication electronic devices that are arranged to communicate via wireless interfaces may be referred to as "wireless communication devices," "wireless devices," and/or "mobile devices." Examples of mobile devices include, but are not limited to, satellite or cellular telephones; personal communication system (PCS) devices that may combine cellular radiotelephone with data processing, fax, and data communication capabilities; PDAs that may include radiotelephones, pagers, Internet/Intranet access, web browsers, memo pads, calendars, and/or global positioning system (GPS) receivers; and conventional laptop and/or palmtop receivers or other electronic devices including radiotelephone transceivers.

Figure 4:
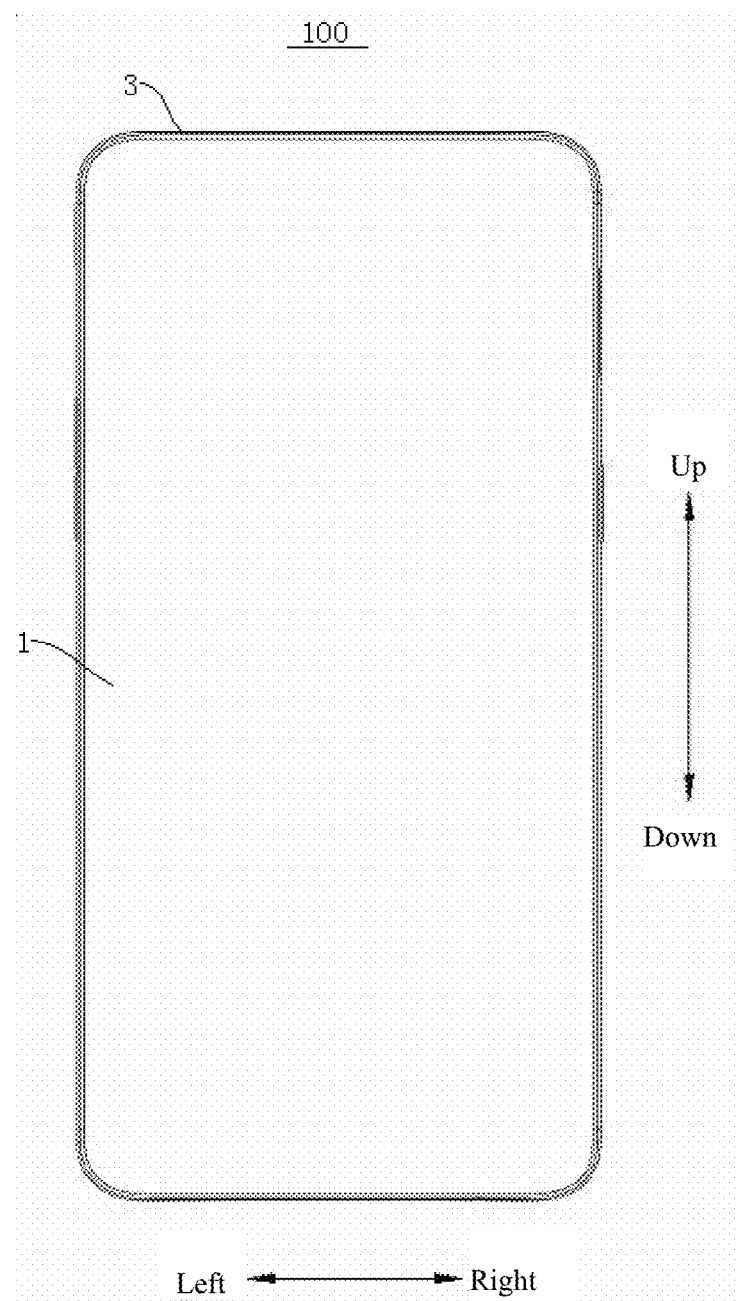
FIG. 4 illustrates a front view of a mobile phone according to an embodiment of the present disclosure.
Figure 5:
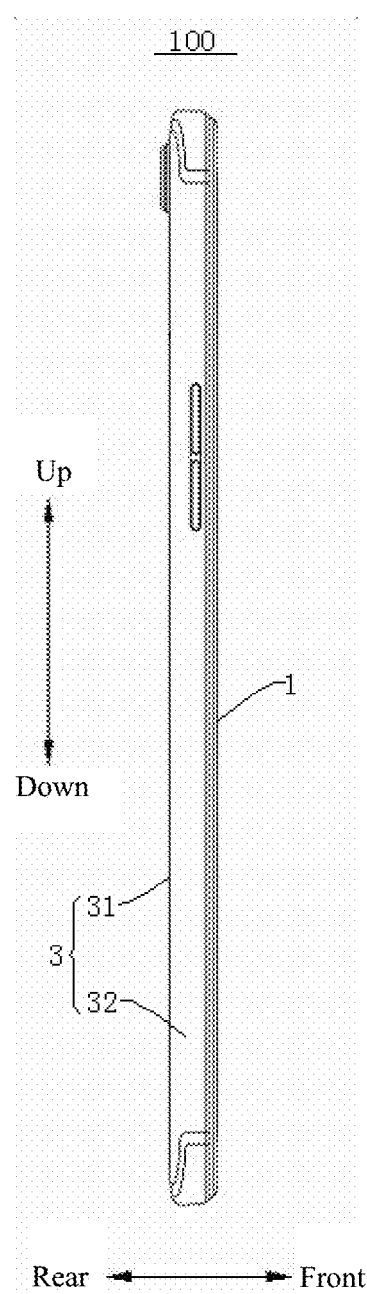
FIG. 5 illustrates a left view of a mobile phone according to an embodiment of the present disclosure.

In an embodiment of the present disclosure, as illustrated in FIGS. 4-5, the electronic device is a mobile phone. Further, the mobile phone may further include a radio frequency circuit, a memory, an input unit, a wireless fidelity (Wi-Fi) module, a sensor, an audio circuit, a processor, a fingerprint identification component, a power source, and the like.

The radio-frequency circuit may be used to receive and transmit a signal during information transmission and reception or during a call. Especially, when downlink information from a base station is received, the RF circuit sends the downlink information to the processor for processing, and additionally sends uplink data from the mobile phone to the base station. Usually, the RF circuit includes but is not limited to an antenna, at least one amplifier, a transceiver, a coupler, a low-noise amplifier, a duplexer and etc. In addition, the RF circuit can communicate with the network and other devices via wireless communication. The wireless communication can employ any communication standard or protocol, including but not limited to global system for mobile communication (GSM), general packet radio service (GPRS), code division multiple access (CDMA), wideband code division multiple access (WCDMA), long term evolution (LTE), e-mail and short messaging service (SMS).

The memory may be used to store software programs and modules, and the processor runs various function applications in the mobile phone and performs data processing by running the software programs and modules stored in the memory. The memory mainly includes a program storage area and a data storage area. The program storage area can store an operating system, at least one application program required for a function (such as a voice playback function, an image playback function and etc.); the data storage area can store data (such as audio data, contacts and etc.) created according to the use of the mobile phone. In addition, the memory may include a high-speed random access memory, and may also include a non-volatile memory, such as at least one disk storage device, a flash memory device, or other volatile solid-state memory devices.

The input unit may be configured to receive incoming numbers or character information, and generate a key signal related to user settings and function control of the mobile phone. Specifically, the input unit may include a touch panel and other input devices. The touch panel, also known as a touch screen, can collect a touch operation made by a user on or near the touch panel (for example, an operation made by the user on the touch panel or near the touch panel by means of a finger, a touch pen or any other suitable object or accessory), and drive the corresponding connection device according to a preset program. Optionally, the touch panel may include a touch detection device and a touch controller.

The touch detection device is configured to detect a touch orientation of the user, detect a signal from the touch operation, and transmit the signal to the touch controller. The touch controller is configured to receive the touch information from the touch detection device, convert it into contact coordinates and send the contact coordinates to the processor, and also configured to receive and execute a command from the processor. In addition, it is possible to realize the touch panel in resistive type, capacitive type, infrared type, surface acoustic wave type and other types. The input unit may include other input devices apart from the touch panel. Specifically, other input devices may include, but are not limited to one or more of a physical keypad, a function key (e.g. a volume control button, an on/off button, etc.), a trackball, a mouse and an operating rod.

Wi-Fi is a short-distance wireless transmission technology, and the electronic device can help the user to send and receive e-mails, browse websites, and access streaming media by means of the Wi-Fi module which provides the user with wireless broadband access to the Internet. However, it could be understood that the Wi-Fi module is not a necessary component of the mobile phone and can be omitted as needed without changing the nature of the present disclosure.

In addition, the mobile phone may also include at least one sensor, such as an attitude sensor, a light sensor and other sensors.

Specifically, the attitude sensor may also be referred as a motion sensor, and as one kind of motion sensor, a gravity sensor can be employed. As for the gravity sensor, a cantilever displacement device is made of an elastic-sensitive element, and an electrical contact is driven by an energy-storage spring made of the elastic-sensitive element, so as to achieve the conversion of gravity changes into electrical signal changes.

As an alternative motion sensor, an accelerometer sensor may be used. The accelerometer sensor can detect the magnitude of acceleration in all directions (generally in three axes), and detect the magnitude and direction of the gravity at rest, and can be used for attitude identification of the mobile phone (such as horizontal and vertical screen switch, related games, magnetometer attitude calibration), and vibration-recognition related functions (such as pedometer and percussion).

In the embodiments of the present disclosure, the motion sensors listed above may be used as an element for obtaining an "attitude parameter" described later, which is not limited thereto, however. Other sensors capable of obtaining the "attitude parameter" fall into the protection scope of the present disclosure, for example, a gyroscope. The working principle and data processing of the gyroscope may be similar to those in the related art, so the detailed description thereof will be omitted to avoid redundancy.

In addition, in the embodiments of the present disclosure, a barometer, a hygrometer, a thermometer, an infrared sensor or the like may be used as a sensor, which will not be described in detail.

The light sensor may include an ambient light sensor and a proximity sensor, in which the ambient light sensor can adjust brightness of the display panel in accordance with the ambient light, and the proximity sensor can turn off the display panel and/or the backlight when the mobile phone is moved to the ear.

The audio circuit, the loudspeaker and the microphone can provide an audio interface between the user and the mobile phone. The audio circuit can transmit an electrical signal converted from the received audio data to the loudspeaker, and the loudspeaker converts the electrical signal into an audio signal to be output. On the other hand, the microphone converts the collected audio signal into the electrical signal, and the audio circuit receives and converts the electrical signal into audio data, and transmits the audio data to the processor. After processed by the processor, the audio data is sent to, for example, another mobile phone via the RF circuit, or is output to the memory for further processing.

The processor is a control center of the electronic device and mounted on a circuit board assembly. The processor is coupled to various parts of the mobile phone by means a variety of interfaces and lines, and performs various functions of the mobile phone and data processing by running or executing software programs and/or modules stored in the memory and by invoking the data stored in the memory, so as to monitor the electronic device overall. Optionally, the processor can include one or more processing units. Preferably, the processor may be integrated with an application processor and a modem processor, in which the application processor mainly handles the operating system, the user interface and the application program, while the modem processor mainly deals with wireless communication.

The power source may be logically coupled to the processor by means of a power management system, to manage functions such as charging, discharging, and power management by means of the power management system. Although not shown, the electronic device may also include a Bluetooth module, and a sensor (such as an attitude sensor, a light sensor and other sensors like a barometer, a hygrometer, a thermometer and an infrared sensor), which will not be described herein.

It could be understood that the mobile phone is only an example of the electronic device, and the present disclosure is not limited thereto. For example, the electronic device of the present disclosure can be a tablet computer.

It should be noted that all the technical features (including the technical features described in different embodiments) described in the present disclosure can be freely combined in a reasonable situation, and new technical solutions formed by the combination are all included in the protection scope of the present disclosure.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments have been illustrated and described, it would be appreciated by those skilled in the art that changes, modifications, alternatives and variants can be made in the embodiments without departing from principles and purposes of the present disclosure. The protection scope of the present disclosure is defined by the claims or the like.

What is claimed is:

1. A foldable device, comprising:
 a housing comprising a rear panel, and a frame connected to a front side of the rear panel and surrounding the rear panel;
 a display screen received in the housing and having a side peripheral wall fitted with the frame, the display screen comprising a first display portion and a second display portion connected to each other, the first display portion being configured to be folded or unfolded with respect to the second display portion; and
 a camera disposed to a rear wall of the first display portion and located between the display screen and the rear panel, the camera being configured to be moved along with the first display portion and further to capture an image through the rear panel when the first display portion is folded or unfolded with respect to the second display portion;
 wherein the first display portion has an area smaller than an area of the second display portion; when the first display portion is folded with respect to the second display portion, a part of the second display portion that does not overlap the first display portion in a direction perpendicular to the first display portion is configured as an exposed portion; and the exposed portion is configured to display image information acquired by the camera when the first display portion is folded with respect to the second display portion;

wherein the housing comprises a first housing portion and a second housing portion rotatably connected to each other; the first display portion is assembled in the first housing portion, and the second display portion is assembled in the second housing portion; and the camera is configured to capture an image through a rear wall of the first housing portion;

wherein the rear panel of the housing is provided with a rear display screen at a rear side of the rear panel, the rear display screen having a rear display portion, and the rear display portion being configured to provide a user with display information, and to be operated by the user, when the first display portion is folded with respect to the second display portion; and wherein the rear display portion is further configured to present the image captured by the camera together with the exposed portion, when the first display portion is folded with respect to the second display portion;

wherein when the first display portion is unfolded with respect to the second display portion, the first display portion and the second display portion oppose the rear panel.

2. The foldable device according to claim 1, wherein the housing is a flexible member.

3. The foldable device according to claim 2, wherein the housing is a rubber member or a silicone member.

4. The foldable device according to claim 1, wherein a folding line of the first display portion being folded with respect to the second display portion extends in a transverse direction.

5. The foldable device according to claim 4 wherein the first display portion and the second display portion have the same width in the transverse direction, but the first display portion has a length smaller than a length of the second display portion in a longitudinal direction.

6. The foldable device according to claim 5, wherein a ratio of the length of the first display portion in the longitudinal direction to the length of the second display portion in the longitudinal direction ranges from ⅒ to ½.

7. The foldable device according to claim 4, wherein when the first display portion is unfolded with respect to the second display portion, the first display portion is located above the second display portion.

8. The foldable device according to claim 4, wherein when the first display portion is unfolded with respect to the second display portion, the first display portion is located below the second display portion.

9. The foldable device according to claim 1, wherein a folding line of the first display portion being folded with respect to the second display portion extends in a longitudinal direction.

10. The foldable device according to claim 9, wherein the first display portion and the second display portion have the same length in the longitudinal direction, but the first display portion has a width smaller than a width of the second display portion in a transverse direction.

11. The foldable device according to claim 10, wherein a ratio of the width of the first display portion in the transverse direction to the width of the second display portion in the transverse direction ranges from ⅕ to ½.

12. The foldable device according to claim 9, wherein when the first display portion is unfolded with respect to the second display portion, the first display portion is located at a left side of the second display portion.

13. The foldable device according to claim 9, wherein when the first display portion is unfolded with respect to the second display portion, the first display portion is located at a right side of the second display portion.

14. The foldable device according to claim 1, wherein the display screen is a flexible display screen.

15. The foldable device according to claim 14, wherein the display screen is an organic light-emitting diode screen.

16. The foldable device according to claim 1, wherein the first display portion is configured to be folded with respect to the second display portion in at least one of a forward direction and a backward direction.

* * * * *